United States Patent
Kim et al.

(10) Patent No.: US 8,587,544 B2
(45) Date of Patent: Nov. 19, 2013

(54) IMAGE DISPLAY APPARATUS AND METHOD OF OPERATING THE SAME

(75) Inventors: Taehyung Kim, Seoul (KR); Byeongkil Ahn, Seoul (KR); Seonghak Moon, Seoul (KR); Janghwan Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 149 days.

(21) Appl. No.: 13/185,704

(22) Filed: Jul. 19, 2011

(65) Prior Publication Data

US 2012/0019462 A1  Jan. 26, 2012

(30) Foreign Application Priority Data

Jul. 20, 2010  (KR) ........................ 10-2010-0070124

(51) Int. Cl.
G06F 3/041  (2006.01)

(52) U.S. Cl.
USPC ........................................................ 345/173

(58) Field of Classification Search
USPC ......................................... 345/173, 174, 157
See application file for complete search history.

(56) References Cited

U.S. PATENT DOCUMENTS

| 5,414,859 | A | * | 5/1995 | Staudacher et al. | 710/240 |
| 5,490,060 | A | * | 2/1996 | Malec et al. | 705/7.29 |
| 6,611,537 | B1 | * | 8/2003 | Edens et al. | 370/503 |
| 7,731,801 | B2 | | 6/2010 | Takemura et al. | |
| 7,737,954 | B2 | | 6/2010 | Kim | |
| 2009/0244032 | A1 | | 10/2009 | Westerman et al. | |
| 2010/0127975 | A1 | | 5/2010 | Jensen | |

FOREIGN PATENT DOCUMENTS

| KR | 10-2005-0087592 A | 8/2005 |
| KR | 10-2006-0112471 A | 11/2006 |
| KR | 10-2010-0027123 A | 3/2010 |

* cited by examiner

*Primary Examiner* — Fred Tzeng
(74) *Attorney, Agent, or Firm* — Birch, Stewart, Kolasch & Birch, LLP

(57) ABSTRACT

There are provided an image display apparatus having a display unit capable of sensing a touch made by a pointing device, and a method for operating the same. The method includes outputting a synchronous signal through the entire region of the display unit, transmitting a first scanning signal and a second scanning signal respectively scanning the display unit in a first direction and a second direction to the pointing device; and acquiring touch position information regarding a touch made by the pointing device by using touch time information regarding time points when the pointing device receives the first scanning signal and the second scanning signal after sensing the synchronous signal. Accordingly, an error in touch recognition caused by the delay of a synchronous signal can be minimized.

18 Claims, 10 Drawing Sheets

IMAGE DISPLAY APPARATUS AND METHOD OF OPERATING THE SAME

This application claims the benefit of priority of Korean Patent Application No. 10-2010-0070124 filed on Jul. 20, 2010 which are incorporated by reference in their entirety herein.

BACKGROUND OF THE INVENTION

1. Field of the Invention

The present invention relates to an image display apparatus and a method of operating the same, and more particularly, to an image display apparatus capable of performing synchronization for touch recognition, and a method of operating the same.

2. Related Art

An image display apparatus is an apparatus equipped with the function of displaying an image that can be viewed by a user. A user may view a broadcast program through the image display apparatus. The image display apparatus displays broadcasting selected by a user from among broadcasting signals emitted from broadcasting stations. The current broadcasting scheme is being converted into digital broadcasting from analog broadcasting.

In the digital broadcasting, digital video and audio signals are emitted. As compared to the analog broadcasting, the digital broadcasting ensures less data loss due to high resistance to external noise, is advantageous for error correction, has a high level of resolution, and provides a clean image. Unlike the analog broadcasting, the digital broadcasting is capable of providing an interactive service.

In this respect, a user wants to input information to an image display apparatus by using various methods and receive results accordingly, not just to view images or information on the image display apparatus. To this end, a user interface is also in development.

In particular, various electronic devices having image display and information processing functions, such as TVs, mobile phones, personal digital assistants (PDA), computers, and the like, are becoming multifunctional. Thus, the importance of communication and information storage through the input of data or the like in information devices is being increased.

According to the related art, data is input to electronic devices by pressing input keys. Of late, a data input method using a touch screen has been increasingly used for electronic devices. In general, a touch screen is an input device substituting an input key, a keyboard, or a mouse. After the touch screen is mounted on a screen, a user directly touches the screen with a finger or a pointing device to thus input data. Here, the touch screen allows a user to intuitively handle work in a graphic user interface (GUI) environment, is suitable for a portable input device, and may be widely used in the fields of computer simulation application, work automation application, game application, and the like.

However, since a finger, a stylus pen, or the like comes into direct contact with a touch panel used in a touch screen as mentioned above, the surface of the touch panel may have fingerprints or scratches left thereon. A user's demand for recognition timing or sensitivity with respect to a touch is growing. Also, in the case where a level of touch intensity is low or subtle or where a touch is made at such a high speed, there is a growing need for an image display apparatus to operate with high sensitivity thereto.

SUMMARY OF THE INVENTION

It is, therefore, an object of the present invention to provide an image display apparatus having a touch screen function capable of accurately sensing even a touch occurring in a fine area, and a method for operating the same. It is also an object of the present invention to provide an image display apparatus capable of accurately deducing the position of a touch on a display unit having a touch screen function, and a method for operating the same. In particular, there is provided an image display apparatus capable of reacting to the position and trace of a touch even in a case where a touch is quickly moving such as in writing or drawing through a touch screen function, and a method for operating the same.

According to an aspect of the present invention, there is provided an image display apparatus having a display unit capable of sensing a touch made by a pointing device, the image display apparatus including: a control unit generating a synchronous signal output through the entire region of the display unit, and a first scanning signal and a second scanning signal respectively scanning the display unit in a first direction and a second direction; and a display unit outputting the synchronous signal, the first scanning signal and the second scanning signal, wherein, the control unit acquires touch position information regarding a touch made by the pointing device by using touch time information regarding time points when the pointing device receives the first scanning signal and the second scanning signal after sensing the synchronous signal.

According to another aspect of the present invention, there is provided A method for operating an image display apparatus having a display unit capable of sensing a touch made by a pointing device, the method including: outputting a synchronous signal through the entire region of the display unit; transmitting a first scanning signal and a second scanning signal respectively scanning the display unit in a first direction and a second direction to the pointing device; and acquiring touch position information regarding a touch made by the pointing device by using touch time information regarding time points when the pointing device receives the first scanning signal and the second scanning signal after sensing the synchronous signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, exemplary embodiments of the present invention will be described in more detail with reference to accompanying drawings.

The terms "module" and "unit" are intended to refer to elements in the following description just for ease of description, and have no significant meaning or role. Therefore, the "module" and the "unit" may be interchangeably used.

Figure 1:
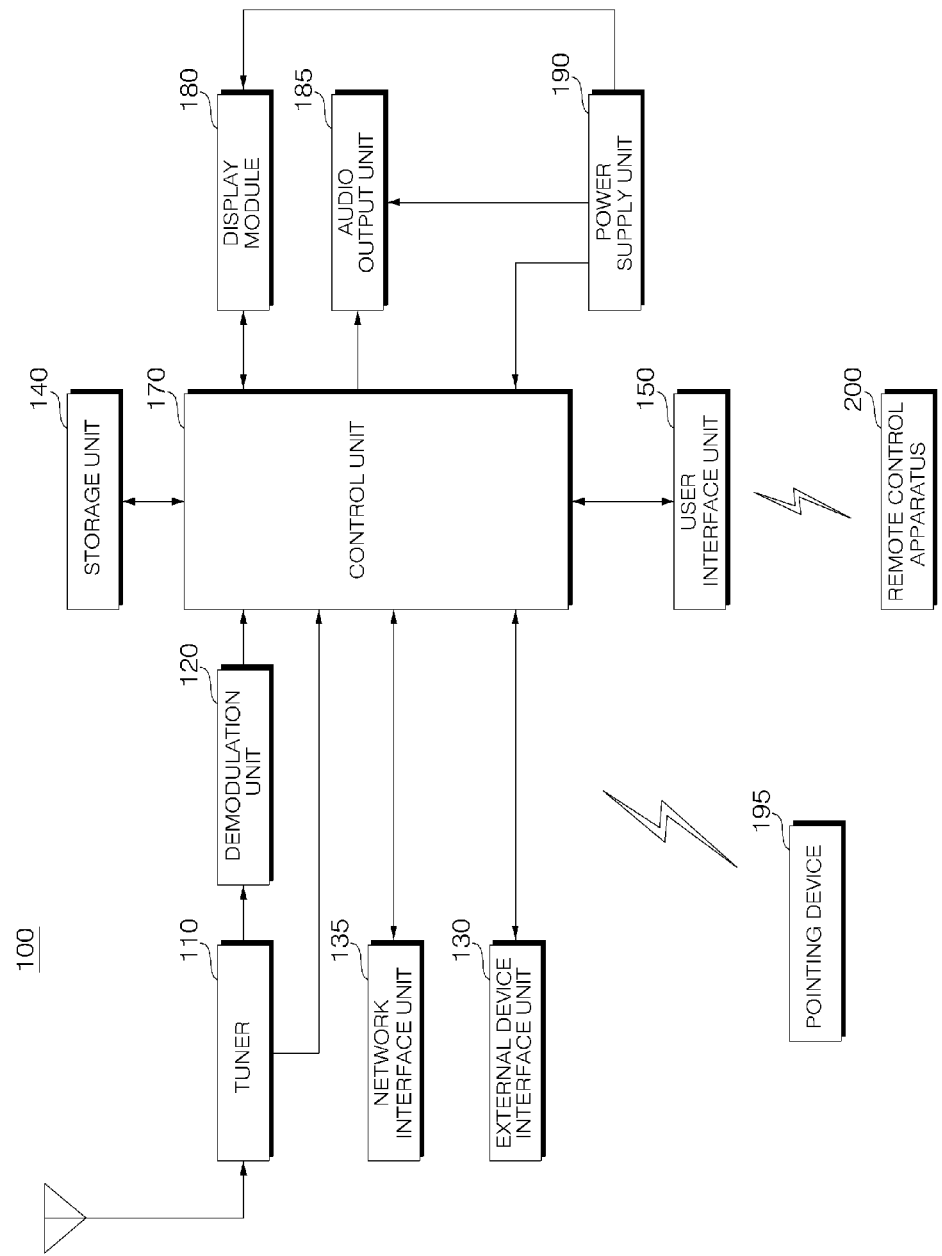
FIG. 1 is an internal block diagram of an image display apparatus according to an exemplary embodiment of the present invention.
Figure 2:
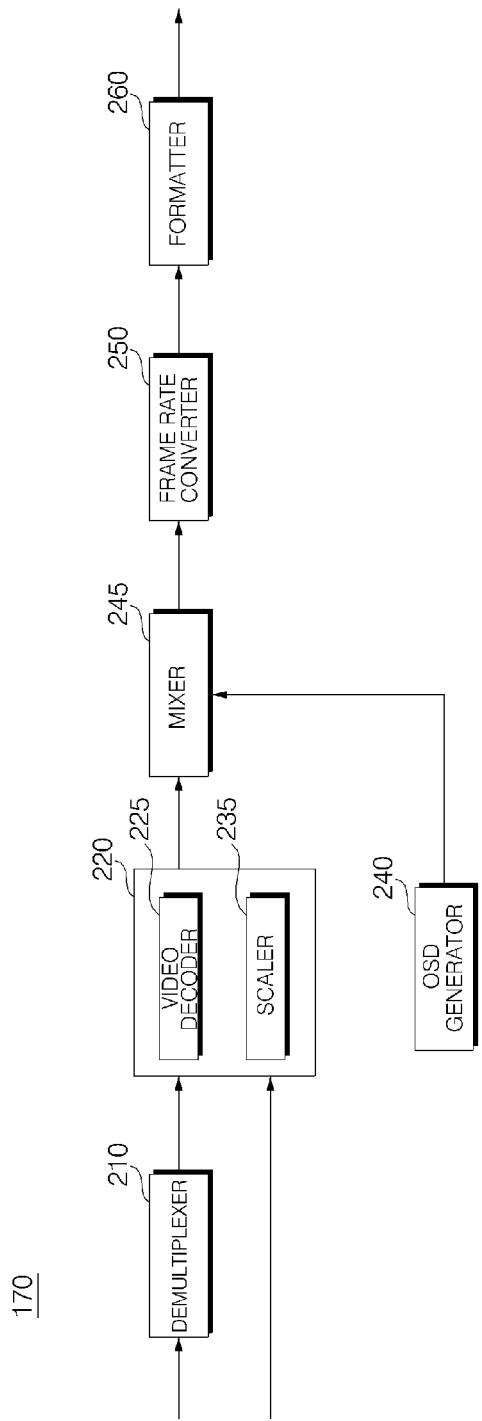
FIG. 2 is an internal block diagram of a control unit depicted in FIG. 1.

FIGS. 1 and 2 are internal block diagrams of an image display apparatus according to an exemplary embodiment of the present invention.

Referring to FIG. 1, an image display apparatus 100 according to an exemplary embodiment of the present invention includes a tuner 119, a demodulation unit 120, an external device interface unit 130, a network interface unit 135, a storage unit 140, a user input interface unit 150, a control unit 170, a display unit 180, an audio output unit 185, and a power supply unit 190, and may be connected to a three-dimensional image viewing device, for example, a shutter glass (not shown).

Also, the image display apparatus 100, according to this exemplary embodiment of the present invention may receive/transmit a signal by being connected to a pointing device 195. The display unit 180 to be described later has a touch screen function, and may transmit/receive predetermined signals to/from the pointing device 195 for the calculation of a touch position of the pointing device 195, the input of a user signal according to the touch, and the like.

The tuner 110 selects a radio frequency (RF) broadcast signal corresponding to a channel selected by a user or every pre-stored channel from among RF broadcast signals received though an antenna. Furthermore, the selected RF broadcast signal is converted into an intermediate frequency signal, a baseband image, or an audio signal.

For example, if the RF broadcast signal is a digital broadcast signal, the selected broadcast signal is converted into a digital IF signal (DIF). If the RF broadcast signal is an analog broadcast signal, it may be converted into an analog baseband image or an audio signal (CVBS/SIF). That is, the tuner 110 may process a digital broadcast signal or an analog broadcast signal. The analog baseband image or the audio signal (CVBS/SIF) output from the tuner may be directly input to the control unit 170.

Furthermore, the tuner 110 may receive RF broadcast signals of a single carrier according to an advanced television system committee (ATSC) scheme, or RF broadcast signals of multiple carriers according to a digital video broadcasting (DVB) scheme.

Meanwhile, the tuner 110 may sequentially select RF broadcast signals of every broadcast channel stored through a channel memory function, from among RF broadcast signals received via an antenna, and convert it into an intermediate frequency signal, a baseband image or an audio signal.

The demodulation unit 120 performs demodulation upon receiving the digital IF signal (DIF) converted by the tuner 110.

For example, in a case where a digital IF signal output from the tuner 110 follows the ATSC scheme, the demodulation unit 120 performs 8-Vestigal Side Band (8-VSB) demodulation. Furthermore, the demodulation unit 120 may perform channel decoding. To this end, the demodulation unit 120 may be provided with a Trellis decoder, a De-interleaver, a Reed Solomon decoder, and the like, so that Trellis decoding, de-interleaving, and Reed Solomon decoding can be performed.

For example, if a digital IF signal output from the tuner 110 follows the DVB scheme, the demodulation unit 120 performs Coded Orthogonal Frequency Division Modulation (COFDMA) demodulation. Furthermore, the demodulation unit 120 may perform channel decoding. To this end, the demodulation unit 120 may be provided with a convolution decoder, a De-interleaver, a Reed Solomon decoder, and the like, so that convolution decoding, de-interleaving, and Reed Solomon decoding can be performed.

The demodulation unit 120, after performing demodulation and channel decoding, may output a stream signal (TS). In this case, the stream signal may be a multiplexed video, audio or data signal. For example, the stream signal may be a MPEG-2 transport stream (TS) where an MPEG-2 video signal, a Dolby AC-3 audio signal, and the like are multiplexed. In more detail, an MPEG-2 TS may include a 4-byte header, and 184-byte payload.

Meanwhile, the demodulation unit 120 may be provided separately according to the ATSC scheme and the DVB scheme. That is, the demodulation unit 120 may be provided as an ATSC demodulation unit and a DVB demodulation unit.

The stream signal output from the demodulation unit 120 may be input to the control unit 170. The control unit 170 performs demultiplexing, video/audio signal processing, and the like, and then outputs an image to the display unit while outputting a sound to the audio output unit 185.

The external device interface unit 130 may access an external device and the image display apparatus 100. To this end, the external device interface unit 130 may include an A/V input/output unit (not shown) or a radio communication unit (not shown).

The external device interface unit 130 may access an external device, such as a digital versatile disk (DVD), a blu ray, a game device, a camera, a camcorder, a computer (a laptop) or the like, wirelessly/by wire. The external device interface unit 130 sends a video, audio or data signal, input from the outside through a connected external device, to the control unit 170 of the image display apparatus 100. Also, the external device interface unit 130 may output the video, audio or data signal processed by the control unit 170 to the external device. To this end, the external device interface unit 130 may include an A/V input/output unit (not shown) or a radio communication unit (not shown).

The A/V input/output unit may include a USB port, a composite video banking sync (CVBS) port, a component port, an S-video port (analog), a digital visual interface (DVI) port, a high definition multimedia interface (HDMI) port, an RGB port, a D-SUB port, or the like so as to input video and audio signals of an external device to the image display apparatus 100.

The radio communication unit may perform near-field radio communication with another electrode device. The image display apparatus 100 may be connected to another electrode device over network according to a communication standard such as Bluetooth, a radio frequency identification (RFID), Infrared Data Association (IrDA), Ultra Wideband (UWB), ZigBee, or the like.

Also, the external device interface unit 130 accesses various set-top boxes through at least one of the above various ports and thus perform input/output operation with the set-top box.

Meanwhile, the external device interface unit 130 may also transmit/receive various data, signals or the like to/from a 3D image viewing device or the pointing device 195 according to various communication schemes, such as an RF communication scheme or an IR communication scheme.

The network interface unit 135 provides an interface for connecting the image display apparatus 100 with a wired/wireless network including an Internet network. The network interface unit 135 may have an Ethernet port or the like for access to the wired network, and Wireless LAN (WLAN) (Wi-Fi), Wireless broadband (Wibro), World Interoperability for Microwave Access (Wimax), High Speed Downlink Packet Access (HSDPA) communication standard, or the like may be used for access to the wireless network.

The network interface unit 135 may receive contents or data, provided by an Internet or network provider or a network operator, through a network. That is, contents such as movies, advertisements, VOD, broadcast signals, and the like, provided from a contents provider, and related information may be received through the network. Also, the update information and update file of firmware, provided by a network operator, can be received. Furthermore, data can be transmitted to an Internet or contents provider or a network operator.

Furthermore, for example, the network interface unit 135 may access an Internet protocol (IP) TV. The network interface unit 135 may receive a video, audio or data signal processed by a set-top box for IPTV and send it to the control unit 170, and may transmit signals, processed by the control unit 170, to the set-top box for IPTV, thus enabling bi-directional communication.

Meanwhile, the IPTV may cover an ADSL-TV, a VDSL-TV, an FTTH-TV or the like according to a kind of transmission network, and may include a TV over DSL, Video over DSL, TV overIP (TVIP), Broadband TV (BTV), or the like. Here, the IPTV may means a full-browsing TV, and an Internet TV capable of Internet access.

The storage unit 140 may store a program for processing and controlling various signals within the control unit 170, and may store processed video, audio or data signals.

Furthermore, the storage unit 140 may perform a function for temporarily storing video, audio or data signals input to the external device interface unit 130. Also, the storage unit 140 may store information regarding a predetermined broadcasting channel through a channel memory function such as a channel map or the like.

The storage unit 140 may include at least one type of storage medium among a flash memory type, a hard disk type, a multimedia card micro type, a card type memory (e.g., an SD or SD memory), a RAM, a ROM (e.g., an EEPROM). The image display apparatus 100 may reproduce a file (a video file, an image file, a music file, a document file, or the like) stored in the storage unit 140 and thus provide it to a user.

FIG. 1 illustrates an embodiment in which the storage unit 140 is provided separately from the control unit 170. However, the scope of the present invention is not limited thereto. The storage unit 140 may be included within the control unit 170.

The user input interface unit 150 transmits a signal input by a user to the control unit 170 or transmits a signal from the control unit 170 to a user.

For example, according to various communication schemes such as an RF communication scheme, an IR communication scheme, or the like, the user input interface unit 150 may receive a user input signal for power On/Off, channel selection, screen setting, or the like from the remote control device 200, or may transmit a signal from the control unit 170 to the remote control device 200.

Also, for example, the user input interface unit 150 may send a user input signal, input through a local key (not shown) such as a power key, a channel key, a volume key, a set value, or the like, to the control unit 170.

Furthermore, for example, the user input interface unit 150 may send a user input signal, input from a sensing unit (not shown) sensing a user's gesture, to the control unit 170 or may transmit a signal from the control unit 170 to the sensing unit (not shown). Here, the sensing unit (not shown) may include a touch sensor, a sound sensor, a position sensor, an operation sensor, and the like.

The control unit 170 demultiplexes streams input through the tuner 110, the demodulation unit 120 or the external device interface unit 130, or processes demultiplexed signals. In such a manner, the control unit 170 can generate and output a signal for image or sound output.

A video signal image-processed by the control unit 170 is input to the display unit 180 so as to be displayed as an image corresponding to the video signal. Furthermore, the video signal image-processed by the control unit 170 may be input to an external output device through the external device interface unit 130.

The audio signal processed by the control unit 170 may be output as a sound to the audio output unit 185. Also, the audio signal processed by the control unit 170 may be input to an external output device through the external device interface unit 130.

Although not shown in FIG. 1, the control unit 170 may include a demultiplexing unit, an image processing unit, and the like. This will be described later with reference to FIG. 2.

Besides, the control unit 170 may control the overall operation in the image display apparatus 170. For example, the control unit 170 controls the tuner 110 so as to tune RF broadcasting corresponding to a channel selected by a user or a pre-stored channel.

Furthermore, the control unit 170 may control the image display apparatus by a user's command input through the user input interface unit 150 or an internal program.

For example, the control unit 170 controls the tuner 110 such that a signal of a channel selected according to a predetermined channel selection command received through the user input interface unit 150 is input thereto. Also, it processes video, audio or data signals of the selected channel. The control unit 170 allows information regarding a channel selected by a user to be output through the display unit 180 or the audio output unit 185 together with the process video and audio signals.

In another example, in response to an external device image reproduction command received through the user input interface unit 150, the control unit 170 allows a video signal or an audio signal from an external device, input through the external device interface unit 130, for example, a camera or a camcorder, to be output through the display unit 180 or the audio output unit 185.

Meanwhile, the control unit 170 may control the display unit 180 to display an image. For example, the control unit 170 may control the display unit 180 to display a broadcast image input through the tuner 110, an external input image input through the external device interface unit 130, an image input through the network interface unit 135, or an image stored in the storage unit 140 on the display unit 180.

In this case, an image displayed on the display unit 180 may be a still image or a video, and may be a 2D image or a 3D image.

Meanwhile, the control unit 170 may generate a 3D object with respect to a predetermined object in an image displayed on the display unit 180. For example, an object may be at least one of accessed web screen (a newspaper, a magazine or the like), an Electronic Program Guide (EPG), various menus, a widget, an icon, a still image, a video, and a text. Such a 3D object may be processed to have different depth than an image displayed on the display unit 180. Particularly, the 3D object may be processed so as to extrude from an image displayed on the display unit 180.

Meanwhile, the control unit 170 may recognize a position of a user based on an image captured from a capturing unit (not shown). For example, a distance (a z-axis coordinate) between the user and the image display apparatus 100 may be recognized. Besides, an x-axis coordinate and a y-axis coordinate in the image display apparatus 100 corresponding to the user's position may be recognized.

Meanwhile, although not shown, a channel browsing processing unit that generates a thumbnail image corresponding to a channel signal or an external input signal may be further provided. The channel browsing processing unit may receives a stream signal (TS) output from the demodulation unit 120 or a stream signal output from the external device interface unit 130, and extracts an image from the input stream signal, thus generating a thumbnail image. The generated thumbnail image may be input to the control unit 170 as it is or after being encoded. Also, the generated thumbnail image may be encoded into a stream and input to the control unit 170. The control unit 170 may display a thumbnail list, including a plurality of thumbnail images, on the display unit 180. The thumbnail list may be displayed in a part of a display region to allow easy viewing while a predetermined image is displayed on the display unit 180, or may be displayed in almost the entire region of the display unit 180 according to a full viewing method.

The display unit 180 converts a video signal, a data signal, an OSD signal, and a control signal processed by the control unit 170, or an image signal, a data signal, a control signal and the like received from the external device interface unit 130 to thus generate a driving signal.

The display unit 180 may be a PDP, an LCD, an OLED, a flexible display, or the like, and in particularly, may be a 3D display according to an exemplary embodiment of the present invention.

The display unit 180 for 3D image viewing may be divided into an additional display type and an independent display type.

The independent display type display unit is capable of solely implementing a 3D image without a separate additional display, for example, glasses or the like. There may be various independent display types such as a reticular method, a parallax barrier, and the like. The additional display type display unit is capable of implementing a 3D image by using an additional display other than the display unit 180, namely, a 3D image viewing device. There may be various additional display types such as a head mount display (HMD) type, a glasses type, and the like. Also, the glasses type may be divided into a passive type such as a polarized glass type or the like, and an active type such as a shutter glass type or the like. Meanwhile, the head mount display type may also be divided into a passive type and an active type. Meanwhile, the display unit 180 may be configured as a touch screen so as to act as an input device as well as an output device. In particular, the display unit 180 may be configured as a touch screen having an optical touch function. The optical touch function of the display unit 180 will be described in more detail in describing an exemplary embodiment with reference to FIG. 3.

The audio output put unit 185 outputs a sound upon receiving a signal audio-processed in the control unit 170, such as a stereo signal, a 3.1 channel signal or a 5.1 channel signal, and outputs a sound. The audio output unit 185 may be implemented as various types of speakers.

Meanwhile, in order to sense a user's gesture, the image display apparatus 100 may further include a sensing unit (not shown) including at least one of a touch sensor, an audio sensor, a position sensor, and an operation sensor as described above. A sensing signal from the sensing unit (not shown) is transmitted to the control unit 170 through the user input interface unit 150.

The control unit 170 may sense a user's gesture by using an image captured from the capturing unit (not shown), a sensing signal from the sensing unit (not shown), or a combination thereof.

The power supply unit 190 supplies power over the entire image display apparatus 100. In particular, the power supply unit 190 may supply power to the control unit 170 that may be implemented in the form of a system on chip (SOC), the display unit 180 for image display, and the audio output unit 185 for audio output. Also, according to an embodiment, the power supply unit 190 may supply power to a heating unit including a hot wire.

The remote control device 200 transmits a user input to the user input interface unit 150. To this end, the remote control device 200 may adopt IR communication, radio frequency communication, Bluetooth, ultra wideband (UWB), Zigbee, or the like. In addition, the remote control device 200 may receive a video, audio or data signal output from the user input interface unit 150, and display the received signal or output sounds in the remote control device 200.

The above image display apparatus 100 may be a stationary digital broadcasting receiver capable of receiving at least one of ATSC (8-VSB) digital broadcasting, DVB-T (COFDM) digital broadcasting, ISDB-T (BST-OFDM) digital broadcasting, and the like. Also, the image display apparatus 100 may be a mobile digital broadcasting receiver capable of receiving at least one of terrestrial Digital multimedia Broadcasting (DMB), satellite DMB, ATSC-M/H digital broadcasting, DVB-H (COFDM) digital broadcasting, Media Forward Link Only digital broadcasting, and the like. Also, the image display apparatus 100 may be a digital broadcasting receiver for a cable TV, satellite communication, or an IPTV.

Meanwhile, the image display apparatus described in this specification may include a TV set, a mobile phone, a smart phone, a notebook computer, a digital broadcasting terminal, a personal digital assistant (PDA), a portable multimedia player (PMP) or the like.

The block diagram of the image display apparatus 100 depicted in FIG. 1 is a block diagram for an exemplary embodiment of the present invention. The respective elements of the block diagram may be combined, added or omitted according to the specification of the actually implemented image display apparatus 100. That is, two or more elements may be integrated into a single element or a single element may be configured divided into two or more elements as occasion demands. Furthermore, a function performed in each block is just for explaining an embodiment of the present invention, and the detailed operation or device is not intended to limit the scope of the present invention.

FIG. 2 is an internal block diagram of the control unit 170 of FIG. 1.

Referring to FIG. 2, the control unit 170 according to an exemplary embodiment of the present invention includes a demultiplexer, an image processor 220, an OSD generator 240, a mixer 245, a frame rate converter, and a formatter 260. Besides, the control unit 170 may further include an audio processor (not shown) and a data processor (not shown).

The demultiplexer 210 demultiplexes an input stream. For example, an in a case where an MPEG-2 TS is input, the MPEG-2 TS is demultiplexed and thus separated into video, audio and data signals. Here, the stream signal input to the demultiplexer 210 may be a stream signal output from the tuner 110, the demodulation unit 120 or the external device interface unit 130.

The image processor 220 may perform image processing upon the demultiplexed video signal. To this end, the image processor 220 may include a video decoder 225 or a scaler 235.

The video decoder 225 decodes the demultiplexed video signal, and the scaler 235 performs scaling so as to cause the resolution of the decoded image signal to be suitable for the display unit 180.

The video decode 225 may utilize decoders of various standards.

For example, in case where the demultiplexed video signal is an MPEG-2 encoded 2D video signal, an MPEG-2 decoder may be used for decoding.

Furthermore, for example, in a case where a demultiplexed 2D video signal is a DMB or DVB-H H.264 encoded video signal, a depth image of MPEC-C part 3, a multi-view image according to multi-view video coding (MVC), or a free-viewpoint image according to Free-viewpoint TV (FTV), decoding may be performed thereon by using an H-264 decoder, an MPEC-C decoder, an MVC decoder or an FTV decoder.

A video signal decoded in the image processor 220 may consist of only a 2D video signal, a mixture of a 2D video signal and a 3D video signal, or only a 3D video signal.

Meanwhile, the image processor 220 may detect whether the demultiplexed video signal is a 2D video signal or a 3D video signal. The image processor 220 may detect whether or not the demultiplexed video signal is a 3D video signal based on a broadcast signal received from the tuner 110, an external input signal from an external device, or an external input signal received via a network. In particular, it may be determined whether the demultiplexed video signal is a 3D video signal by referring to format information of a 3D image, 3D image metadata, or a 3D image flag within a header of a stream.

Meanwhile, the video signal decoded in the image processor 220 may be a 3D video signal with various formats. For example, it may be a 3D video signal consisting of a color image and a depth image, or a 3D video signal with a multi-view video signal. The multi-view video signal may include, for example, a left-eye image signal and a left-eye image signal.

The format of a 3D video signal may be determined according to a method of disposing a left-eye image and a right-eye image in order to implement a 3D image. A 3D image may be a multi-view image, and a user can view the multi-view image with the left eye and the right eye. The user may perceive a 3D effect from a 3D image through a disparity between images sensed by the left eye and the right eye. According to an exemplary embodiment of the present invention, the multi-view image for implementing a 3D image includes a left-eye image that a use can recognized with his left eye and a right-eye image recognizable by the right eye. The audio processor (not shown) within the control unit 170 may perform audio processing upon a demultiplexed audio signal. To this end, the audio processor (not shown) may be provided with various decoders.

For example, in a case where the demultiplexed audio signal is an encoded audio signal, the audio process may decode the audio signal. In detail, in a case where the demultiplexed audio signal is an MPEG-2 encoded audio signal, an MPEG-2 decoder may be used for decoding. Also, in a case where the demultiplexed audio signal is a DMB, MPEG 4 Bit Sliced Arithmetic Coding (BSAC) encoded audio signal, an MPEG-4 decoder may be used for decoding. Also, in a case where the demultiplexed audio signal is a satellite DMB or DVB-H, MPEG 2 Advanced Audio Codec (AAC) encoded audio signal, an AAC decoder may be used for decoding. Furthermore, in a case where the demultiplexed audio signal is a Dolby AC-3 encoded audio signal, an AC-3 decoder may be used for decoding.

Furthermore, the audio processor (not shown) in the control unit 170 may process a base, a treble, volume control, and the like.

The data processor (not shown) in the control unit 170 may perform data processing upon a demultiplexed data signal. For example, in a case where the demultiplexed data signal is an encoded data signal, the data process can perform decoding. The encoded data signal may be EPG information including broadcasting information regarding a start time, an end time and the like of a broadcasting program provided from each channel. For example, in the case of an ATSC scheme, the EPG information may be ATSC-Program and System Information Protocol (TSC-PSIP) information. In the case of a DVB scheme, the EPG information may include DVB-Service Information (DVB-SI). The ATSC-PSIP information or the DVB-Sl may be included in the header (4 bytes) of an MPEG-2 TS.

Meanwhile, FIG. 2 is associated with mixing by the mixer 245 a signal from the OSD generator 240 and the image processor 220, and then performing in the formatter 260 3D processing and the like, but the present invention is not limited to the illustration, and the mixer may be located after the formatter. That is, the output of the image processor 220 is subjected to 3D processing in the formatter 260, the OSD generator 240 performs 3D processing together with OSD generation, and the mixer 245 may then perform mixing upon the processed 3D signals.

The block diagram of the control unit 170 shown in FIG. 2 is a block diagram for an exemplary embodiment of the present invention. The respective elements of the block diagram may be combined, added or omitted according to the specification of the actually implemented control unit 170.

In particular, according to an embodiment, the frame rate converter 250 and the formatter 260 may be separately provided without being provided in the control unit 170. According to an embodiment, the frame rate converter 250 may be included in the formatter 260.

Figure 3:
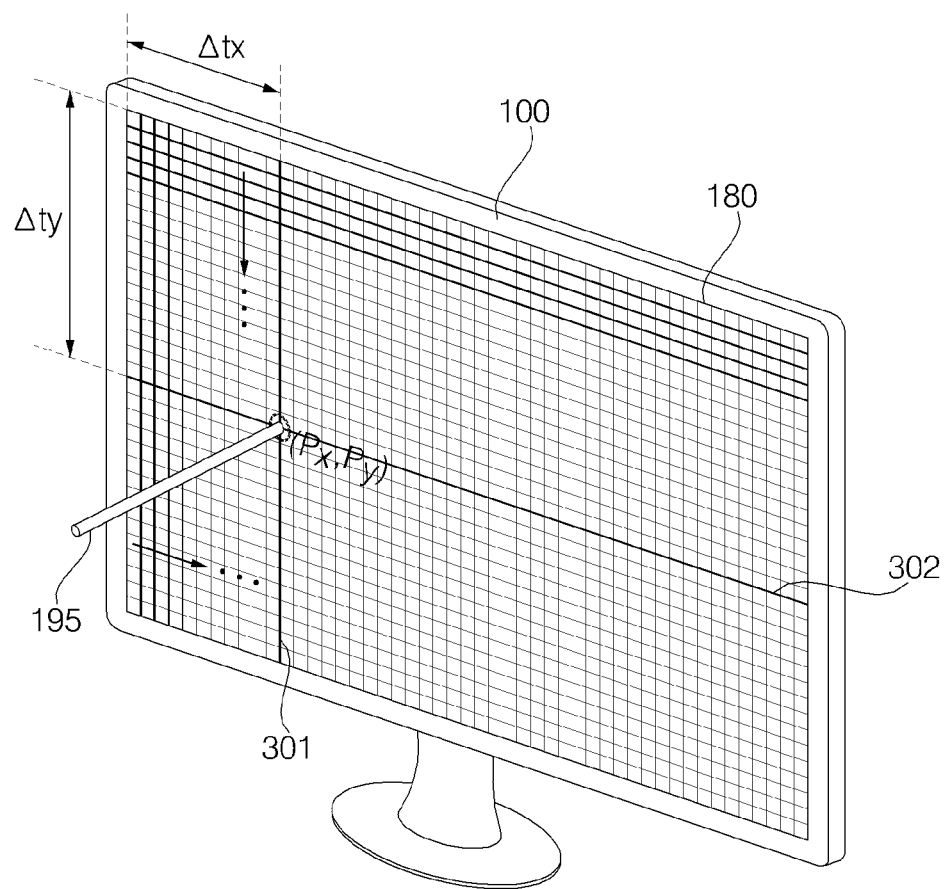
FIG. 3 is a view illustrating the exterior of a display unit and a pointing device.

FIG. 3 illustrates the exterior of the pointing device 195 and the display unit of the image display apparatus, according to an exemplary embodiment of the present invention. The image display apparatus, according to an exemplary embodiment of the present invention, may include the display unit 180 having an optical touch type touch screen function. That is, the display unit 180 may be an optical touch panel. A touch on the display unit 180 may be applied by the pointing device 195. When the pointing device 195 is positioned on a specific spot of the display unit 180, a signal for scanning the display unit 180 is output to sense the position of the pointing device 195. The pointing device 195 receives a plurality of scanning signals output through the display unit, and may store information regarding the time of signal reception.

As one example, the output of a scanning single may proceed in a first direction and a second direction. Here, the first direction may be a horizontal direction, namely, an x-axial direction when assuming that the display unit 180 is the x-y plane. The second direction may be a vertical direction, namely, a y-axial direction when assuming that the display unit is the x-y plane. Here, by way of example, the second direction is a y-axial direction in which the y value decreases.

In an embodiment described with reference to FIG. 3, the pointing device receives a first scanning signal 301, proceeding in the first direction, and a second scanning signal 302, proceeding in a second direction, at a specific time point, thus calculating coordinates (Px, Py) of a touch point of the pointing device 195.

The image display apparatus 100 sequentially outputs the first scanning signal in the first direction through the display unit 180. After the time $\Delta tx$ elapses, the pointing device 195 receives the first scanning signal 302, and after the time $\Delta ty$ elapses, the pointing device 195 receives the second scanning signal 302. Here, $\Delta tx$ and $\Delta ty$ are temporal information, and such temporal information used in calculating a touch position may be referred to as touch time information. According to the touch time information, the image display apparatus may recognize a position in the display unit 180 from which the scanning signal sensed or received by the pointing device 195 is output, and accordingly can calculate the position where the pointing device 195 was located.

That is, the image display apparatus according to the exemplary embodiment described with reference to FIG. 3 may acquire the touch position information of the pointing device 195 by converting the temporal information into spatial information. The process of converting the touch time information into the touch position information may be performed by a calculation module of the control unit 170 of the image display apparatus, or the pointing device 195.

In order to accurately sense the touch position by using $\Delta tx$ and $\Delta ty$, the temporal information, synchronization between the image display apparatus and the pointing device 195 needs to be performed. Since a reference point of time is determined and then $\Delta tx$ and $\Delta ty$, the elapsed periods of time, are measured, delay occurring in any one side in a synchronization process interrupts the accurate calculation of the touch position information as well as the touch time information. Therefore, it is important to prevent delay from occurring in the transmission/reception of synchronous signals. That is, if a difference occurs between the time point when the image display device transmits a synchronous signal to the pointing device 195 for synchronization and the time point when the pointing device 195 receives the corresponding synchronous signal, the touch time information cannot be accurately calculated.

In particular, in a case where a synchronous signal is transmitted wirelessly, delay may occur. According to the related art, an IR signal, an RF signal, an ultrasonic wave or the like is used in transmission of a synchronous signal. In the case of synchronization using an IR signal, an error in frequency may occur according to frequency modulation. In the case of using ultrasonic waves for synchronization, interference caused by external noise may occur, and the transmission result of a synchronous signal may vary according to where the pointing device 195 is located. In the case of an RF signal, severe interference with another radio signal may occur, and in the case of sine waves, the amplitude varies and the standard is not fixed.

Accordingly, in the embodiment of the present invention, a synchronous signal utilizes an optical signal output through the entire region of the display unit 180, rather than using a transmission method using the IR signal, the RF signal and the like. That is, before or after a scanning signal is transmitted, a reference point of time may be set by using synchronous signals simultaneously output from the entire region of the display unit 180. In this case, the pointing device 195 directly receives the synchronous signals at its current location, thus lowers the possibility of delay in transmitting the synchronous signals. Even if delay occurs, the degree of delay may be insignificant. A signal being used as such synchronous signals will be described later in more detail.

Meanwhile, one side of the pointing device 195 does not necessarily need to come into physical contact with the display unit to make a touch using the pointing device 195. Positioning the pointing device on a specific spot on the display unit at a predetermined distance from the display unit may be considered to be a touch.

The image display apparatus, according to an exemplary embodiment of the present invention, may include a display unit, such as e-paper, a PDP, an LCD, an OLED, or the like. In the present invention, the kind of image display apparatus is not limited, but preferably, a display function according to a sub-frame scheme may be driven. In order to explain one example of the image display apparatus, a PDP type image display apparatus among various types of image display apparatuses will be described by way of example.

Hereinafter, the structure of a plasma display panel (PDP) usable as the display unit 180 and a method of driving the same will be described with reference to FIGS. 4 to 7 by way of example.

Figure 4:
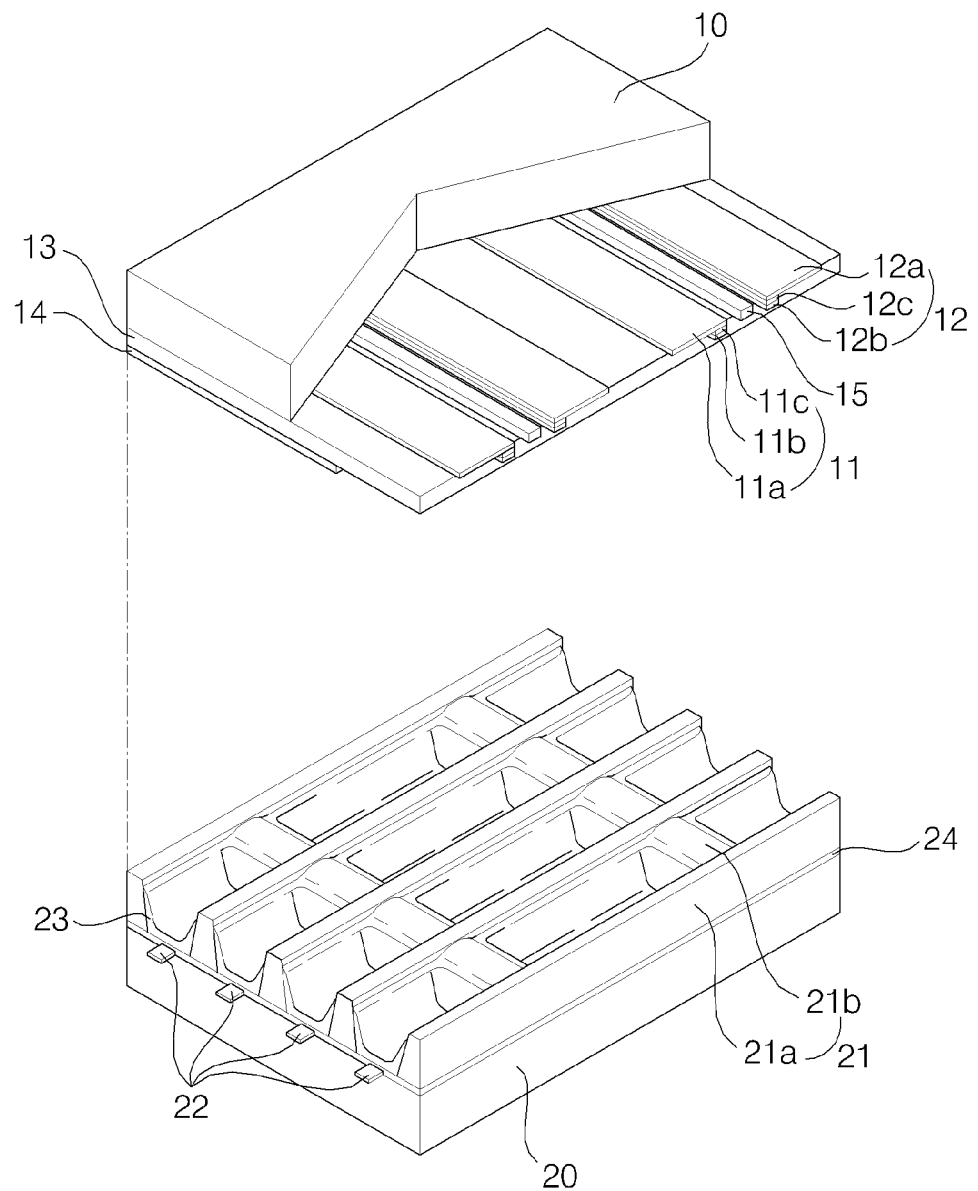
FIG. 4 is a perspective view illustrating a structure of a plasma display panel.
Figure 5:
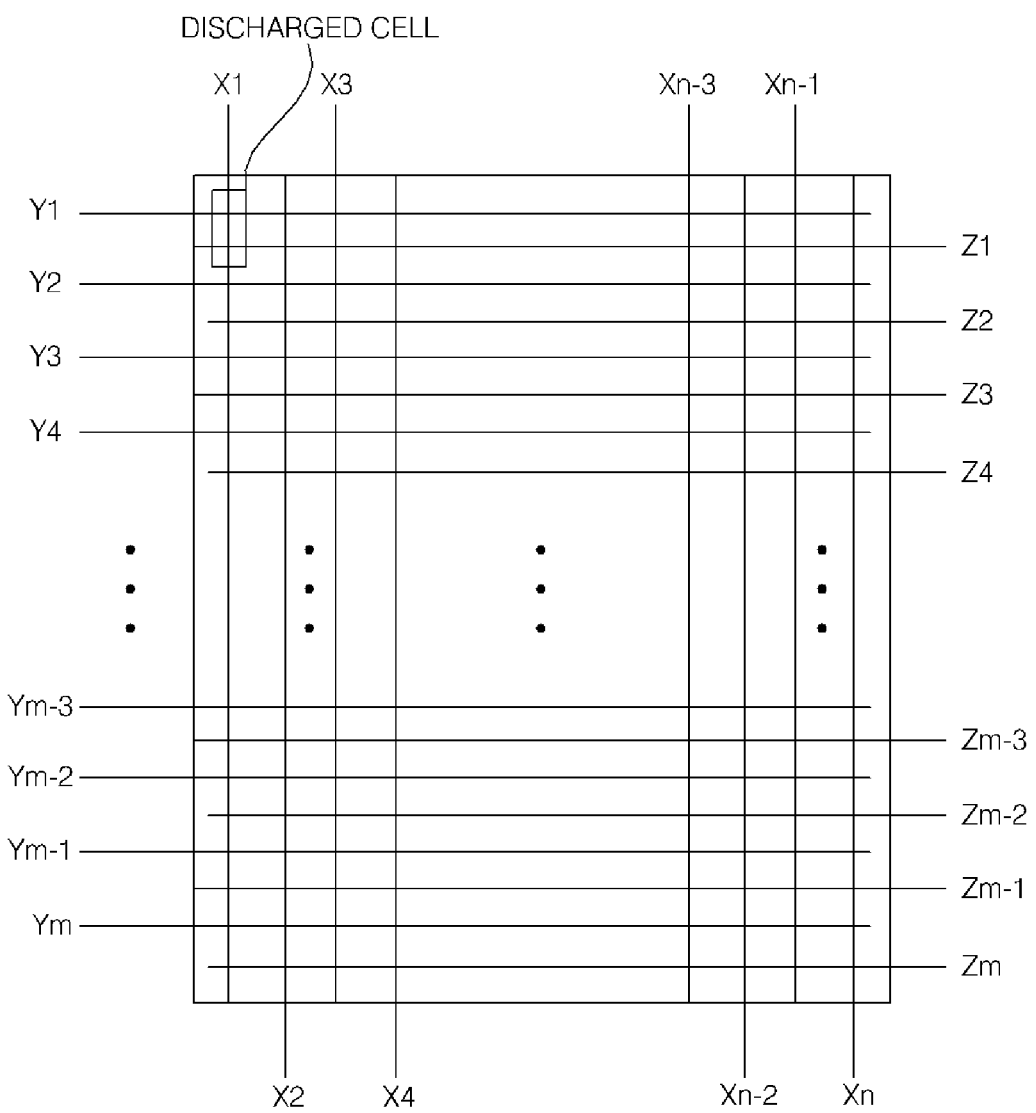
FIG. 5 is a view illustrating the electrode disposition of a plasma display panel according to an exemplary embodiment of the present invention.

FIG. 4 is a perspective view illustrating a structure of a plasma display panel, and FIG. 5 is a view illustrating the electrode disposition of the plasma display panel according to an exemplary embodiment of the present invention.

Figure 6:
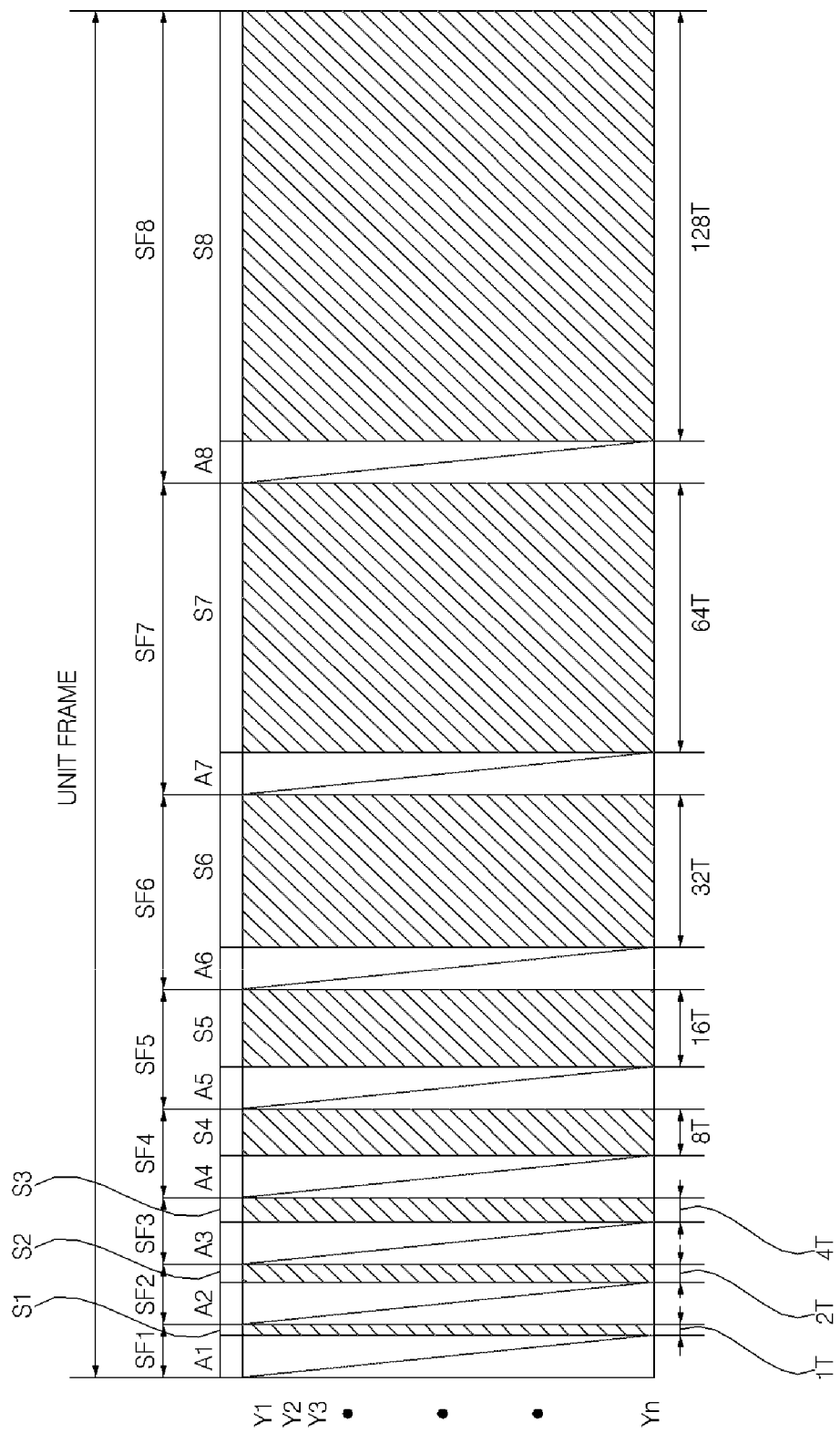
FIG. 6 is a view illustrating a method in which a plasma display panel is time-division driven with a single frame being divided into a plurality of sub-fields according to an exemplary embodiment of the present invention.
Figure 7:
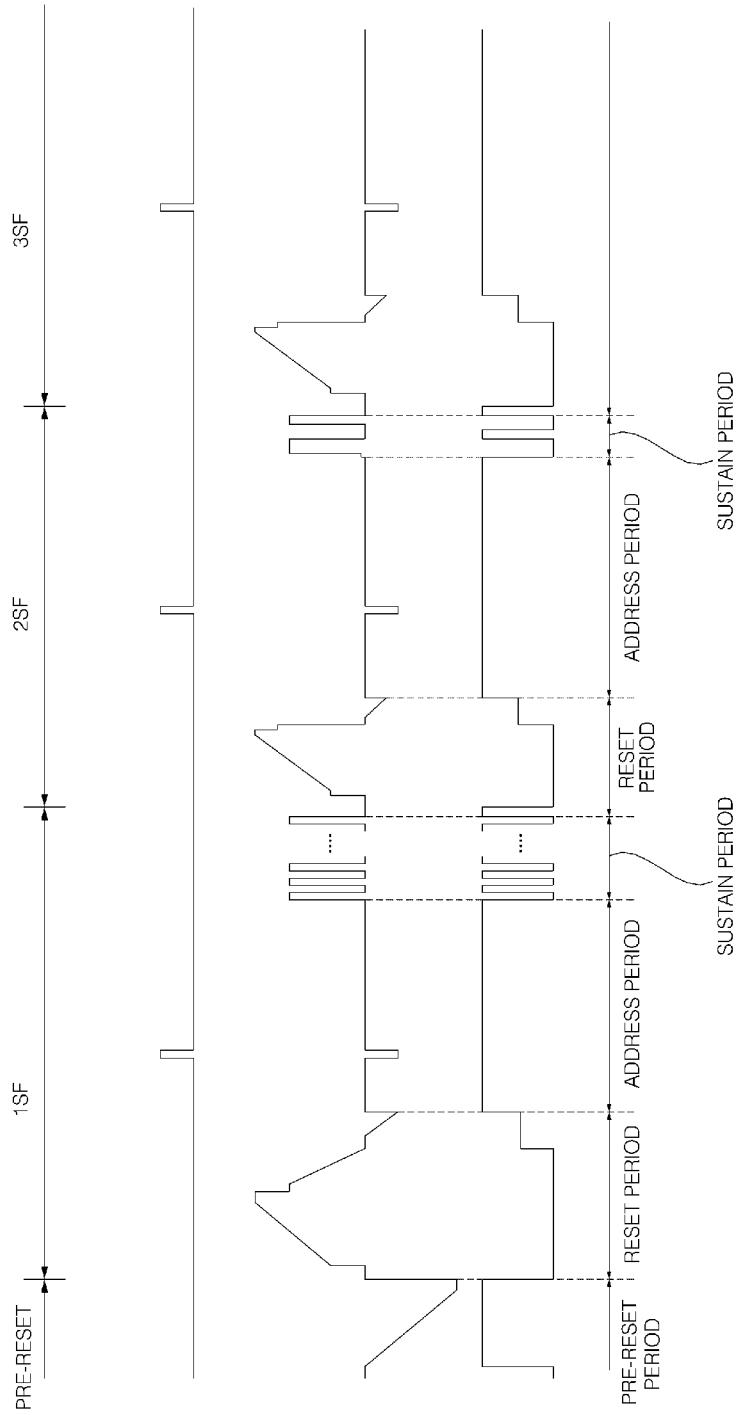
FIG. 7 is a view illustrating one example of the waveform of a driving signal for driving a plasma display panel.

FIG. 6 is a view illustrating a method in which a plasma display panel is time-division driven with a single frame being divided into a plurality of sub-fields according to an exemplary embodiment of the present invention, and FIG. 7 is a timing view illustrating one example of the waveform of a driving signal for driving the plasma display panel.

FIGS. 4 and 5 are views illustrating the internal structure of a plasma display panel usable in an exemplary embodiment of the present invention. FIG. 4 is a perspective view illustrating the structure of the plasma display panel, and FIG. 5 illustrates one embodiment of the electrode disposition of the plasma display panel.

As shown in FIG. 4, the plasma display panel includes a scan electrode 11 and a sustain electrode, which is a sustain electrode pair 11 formed on an upper substrate 10, and an address electrode 22 formed on a lower substrate 20.

The sustain electrode pair 11 and 12 includes transparent electrodes 11a and 12a generally formed of indium tin oxide (ITO), and bus electrodes 11b and 12b. The bus electrodes 11b and 12b are formed on the transparent electrodes 11a and 12a, respectively, thus reducing a voltage drop caused by the transparent electrodes 11a and 12a having a high level of resistance.

According to an embodiment, the sustain electrode pair 11 and 12 may be configured only with the bus electrodes 11 b and 12b without the transparent electrodes 11 a and 12a. Since the transparent electrodes 11a and 12a are not used in such a structure, the unit cost of panel fabrication can be reduced.

A black matrix (BM) 15 is arranged between the transparent electrodes 11a and 12a and the bus electrodes 11b and 12b of the scan electrode 11 and the sustain electrode 12. The black matrix 15 serves to perform a light blocking function by absorbing external light generated outside the upper substrate 10 and thus reducing reflection, and serves to enhance the purity of the upper substrate 10 and contrast. According to an embodiment, the black matrix 15 may be arranged in a different location.

An upper dielectric layer 13 and a passivation layer 14 are stacked on the upper substrate 10 including the scan electrode 11 and the sustain electrode 12 arranged parallel to each other. Charged particles generated by discharge are accumulated in the upper dielectric layer 13, and the upper dielectric layer 13 may serve to protect the sustain electrode pair 11 and 12. The passivation layer 14 protects the upper dielectric layer 13 from the sputtering of charged particles generated at the time of gas discharge, and enhances the emission efficiency of secondary electrons.

Also, the address electrode 22 is formed to intersect the scan electrode 11 and the sustain electrode 12. Furthermore, a lower dielectric layer 23 and a partition wall 21 are formed on the lower substrate 20 including the address electrode 22.

Furthermore, a fluorescent layer 23 is formed on the surfaces of the lower dielectric layer and the partition wall 21. The partition wall 21 is formed in a closed fashion by having a vertical partition wall 21a and a horizontal partition wall 21b, physically defines discharge cells, and prevents ultraviolet rays and visible rays generated by discharge from being leaked to a neighboring discharge cell.

In the exemplary embodiment of the present invention, the partition wall 21 is not limited to the structure of the partition wall 21 depicted in FIG. 4, and may have various structures. Also, in the exemplary embodiment of the present invention, R, G and B discharge cells are illustrated and described as being linearly arranged, but may be arranged in a different manner.

Also, the fluorescent layer 23 emits light by ultraviolet rays generated at the time of gas discharge, and thus generates visible rays of one of (R), green (G) and blue (B). Herein, an inert gas mixture such as He+Xe, Ne+Xe, He+Ne+Xe or the like for discharge is injected into a discharge space provided between the upper/lower substrate 10/20 and the partition wall 21.

Figure 9:
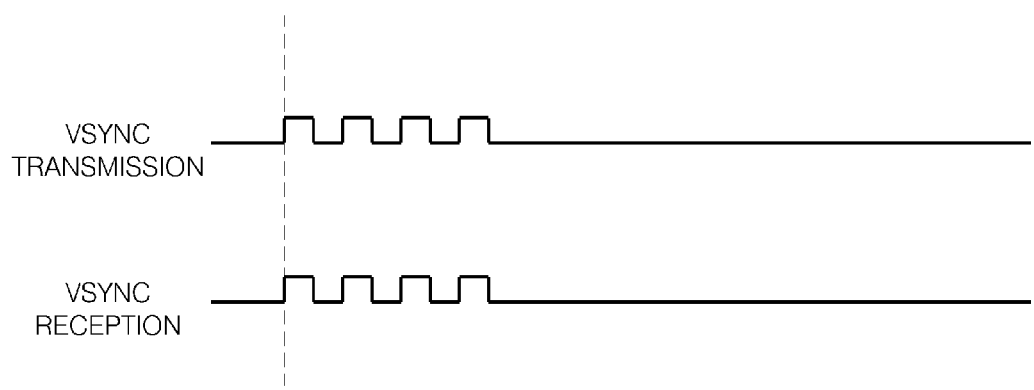
FIG. 9 is a view illustrating the timing of a synchronous signal being transmitted/received without delay according to an exemplary embodiment of the present invention.

FIG. 5 illustrates an embodiment of the electrode disposition of the plasma display panel. A plurality of discharge cells constituting the plasma display panel may be disposed in form of a matrix as shown in FIG. 9. The plurality of discharge cells may be provided at the respective crossings of scan electrode lines Y1 to Ym, sustain electrode lines Z1 to Zm, and address electrode lines X1 to Xn. The scan electrode lines Y1 to Ym may be driven sequentially or simultaneously, and the sustain electrode lines Z1 to Zm may be simultaneously driven. The address electrode lines X1 to Xn may be divided into even-numbered lines and odd-numbered lines to be driven separately, or may be sequentially driven.

FIG. 6 is a view illustrating one embodiment of a method in which a single frame is divided into a plurality of sub-fields and the plasma display panel is time-division driven accordingly.

FIG. 6 shows a timing view regarding a method of dividing a single frame into a plurality of sub-fields and performing time-division driving thereupon according to an exemplary embodiment of the present invention. A unit frame may be divided into a predetermined number of sub-fields, for example, eight sub-fields SF1 to SF8 in order to realize time-division gray-scale expression. Also, each of the sub-fields SF1 to SF8 is divided into a reset period (not shown), an address period (A1, . . . A8), and a sustain period (S1, . . . S8).

Here, according to an exemplary embodiment of the present invention, the reset period may be omitted in at least one of the plurality of sub-fields. For example, the reset period may be present in only the first sub-field or only an intermediate sub-field among the first sub-field and the rest of the sub-fields.

In each of the address periods A1 to A8, a display data signal is applied to address electrodes (X), and a corresponding scan pulse is sequentially applied to each scan electrode (Y).

In each sustain period S1 to S8, a sustain pulse is alternately applied to the scan electrodes (Y) and sustain electrodes (Z), and thus discharge cells where wall charges are formed bring about sustain discharge in the address periods A1 to A8.

The luminance of the plasma display panel is in proportion to the number of sustain discharge pulses within the sustain discharge sections S1 to S8 in the unit frame. In a case where a single frame forming image 1 is expressed with eight sub-fields and 256 gray levels, a different number of sustain pulses may be assigned to the respective sub-fields at sequential rates of 1, 2, 4, 8, 16, 32, 64, and 128. In order to obtain the luminance of grey level 133, sustain discharge may be performed by addressing cells during a sub-field 1 period, a sub-field 3 period, and a sub-field 8 period.

The number of sustain discharges allocated to each sub-field may be variably determined according to the weight of sub-fields according to automatic power control (APC). That is, in FIG. 6, a single frame is divided into eight sub-fields by way of example, but the present invention is not limited thereto. The number of sub-fields forming a single frame may be variously changed according to the design specification. For example, the plasma display panel may be driven with a single frame being divided into eight or more sub-fields such as 12 sub-fields or 16 sub-fields.

Also, the number of sustain discharges allocated to each sub-field may be varied in due consideration of gamma characteristics or panel characteristics. For example, the gray level allocated to subfield 4 is lowered from 8 to 6, and the gray level allocated to sub-field 6 may be increased from 32 to 34.

FIG. 7 is a view illustrating one example of the waveform of a driving signal for driving a plasma display panel. In FIG. 7, one embodiment regarding a driving signal for driving the plasma display panel is expressed into a timing view. The plasma display panel has been described so far by way of example, and the waveform of a driving signal is also for the plasma display panel. However, as mentioned above, the plasma display panel is merely an example used for ease of description, and embodiments of the present invention is applicable to any display apparatus driven by using sub-frames regardless of the kind of display apparatus.

A sub-field may include a reset period for initiating discharged cells on a screen, an address period for selecting discharged cells, and a sustain period for maintaining the discharge of the selected discharged cells.

According to an embodiment, a pre-reset period for forming wall charges of positive polarity on the scan electrodes Y and forming wall charges of negative polarity on the sustain electrodes Z may be further included.

The reset period includes a set-up period and a set-down period. In the set-up period, a Ramp-up waveform is applied to all of the scan electrodes at the same time, thus causing fine discharge in every discharged cell and thus generating wall charges. In the set-down period, a Ramp-down waveform falling at a positive voltage lower than the peak voltage of the Ramp-up waveform is applied to all of the scan electrodes Y at the same time, thus causing erasing discharge in every discharged cell and thus erasing unnecessary charges among space charges and wall charges generated by the set-up discharge.

In the address period, a scan signal having a negative scan voltage Vsc is sequentially applied to the scan electrodes while a positive data signal is applied to the address electrodes (X). Address discharge is caused by the voltage difference between the scan signal and the data signal and the wall voltage generated during the reset period, thus selecting a cell. In order to increase the efficiency of address discharge, a sustain bias voltage (Vzb) is applied to the sustain electrodes during the address period.

During the address period, the plurality of scan electrodes Y may be grouped into two or more groups, and scan signals may be sequentially supplied to the groups.

Furthermore, the plurality of scan electrodes Y may be grouped into a first group of even-numbered scan electrodes and a second group of odd-numbered scan electrodes according to the positions thereof on the panel. In another embodiment, the plurality of scan electrodes Y may be divided into a first group of upper scan electrodes with respect to the center of the panel, and a second group of lower scan electrodes.

The scan electrodes belong to the first group, having been divided in the above manner, may be re-grouped into a first sub-group of even numbered scan electrodes, and a second sub-group of odd-numbered scan electrodes, or may be re-grouped into a first sub-group of upper scan electrodes with respect to the center of the first group, and a second sub-group of lower scan electrodes.

In the sustain period, sustain pulses having a sustain voltage (Vs) is alternately applied to the scan electrodes and the sustain electrodes, thus causing sustain discharge in the form of surface discharge between the scan and sustain electrodes.

According to an embodiment of the present invention, a signal of the sustain period may be used as a synchronous signal. However, in order for the pointing device 195 to discriminate a synchronous signal from other signals, a signal transmitted as a synchronous signal may be controlled in terms of frequency, transmission interval, the number of transmissions and the like. In particular, in an example of using a signal of the sustain period, characteristics of a synchronous signal may be further added to the signal for the discrimination from other signals of the sustain period.

To this end, the control unit 170 may set a frequency of a synchronous signal to a preset frequency for synchronization with the pointing device 195 and output a signal accordingly. Alternatively, in a case where a synchronous signal is output at least two times, the control unit 170 may set the number of times that a synchronous signal is output to the number of times preset for synchronization with the pointing device 195, or may set the output interval of a plurality of synchronous signals to an interval preset for synchronization with the pointing device 195. In a case where at least two synchronous signals are output, the intervals therebetween does not need to be constant, and an interval allowing the pointing device 195 to discriminate a synchronous signal is acceptable.

Meanwhile, the use of a signal of the sustain period is explained by way of example, but the image display apparatus does not necessary need to use a signal transmitted during the sustain period. A signal that can be simultaneously output through the entire region of the display unit 180 or a signal capable of minimizing delay occurrence is adequate for a synchronous signal, and the scope of the present invention is not limited by the kind of synchronous signal.

Also, the driving waveforms shown in FIG. 7 are one embodiment regarding signals for driving the plasma display panel usable in the present invention. The present invention is not limited to the waveforms depicted in FIG. 7.

Figure 8:
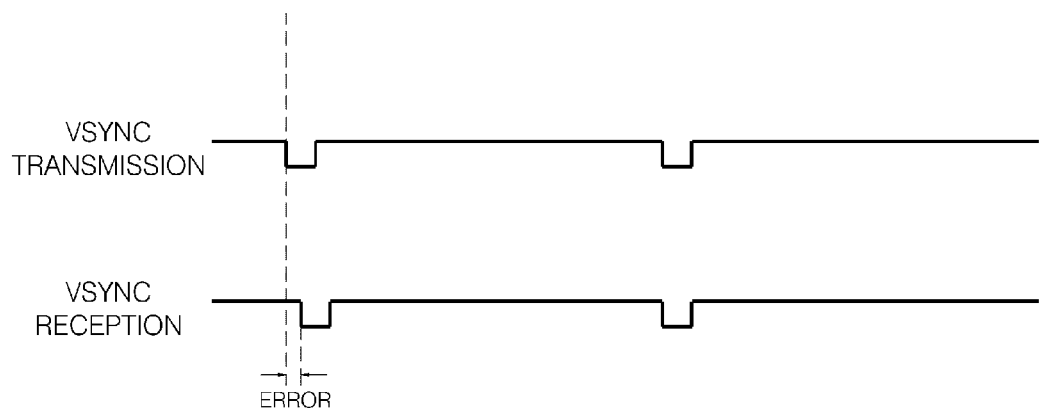
FIG. 8 is a view illustrating a delay phenomenon when a synchronous signal is transmitted according to the related art.

FIG. 8 is the phenomenon where the transmission of a synchronous signal is delayed in the related art. Referring to FIG. 8, it can be seen that there is a difference between the time point when the image display apparatus initially transmits a synchronous signal Vsync, and the time point when the pointing device 195 receives the synchronous signal from the image display apparatus. In this case, a reference time point serving as a reference of determining touch time information to deduce a touch position is varied, and consequently, it is difficult to accurately calculate touch time information and touch position information according to the touch time information.

FIG. 9 is a view showing timing when a synchronous signal is transmitted/received without delay according to an exemplary embodiment of the present invention. As shown in FIG. 9, the time point when the image display apparatus transmits a synchronous signal Vsync to the pointing device 195 is equal to the time point when the pointing device 195 receives the synchronous signal from the image display apparatus.

Particularly, according to an exemplary embodiment of the present invention, since synchronous signals are simultaneously output from the entire region of the display unit 180, a synchronous signal is output at the spot where the pointing device 195 is positioned, thus reducing the possibility of delay or the degree of delay.

Figure 10:
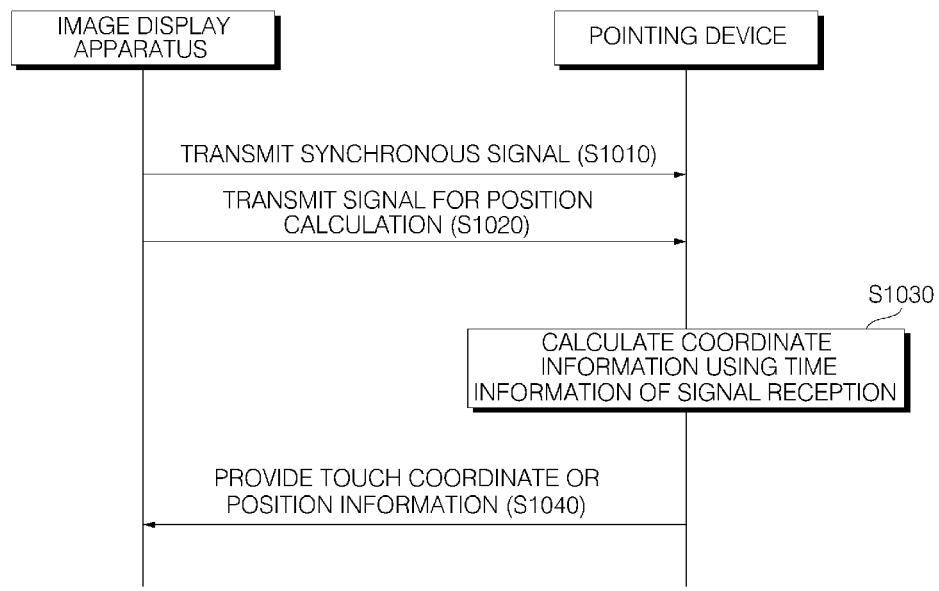
FIGS. 10 and 11 are views illustrating signals transmitted/received between an image display apparatus and a pointing device according to an exemplary embodiment of the present invention.
Figure 11:
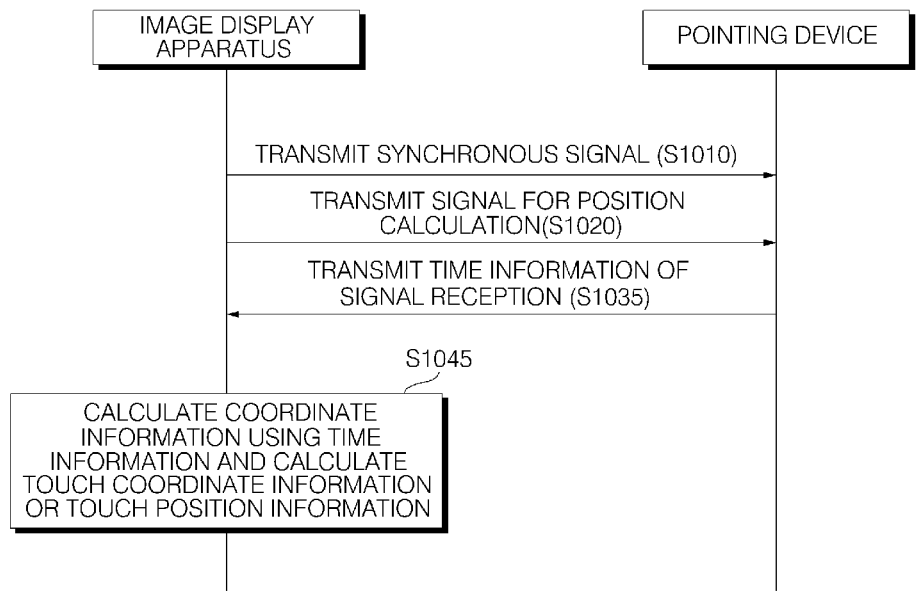

FIGS. 10 and 11 are views illustrating signals transmitted/received between the image display apparatus and the pointing device 195 according to an exemplary embodiment of the present invention. First, FIG. 10 shows the flow of signal transmission between the image display apparatus and the pointing device 195, according to an exemplary embodiment of the present invention.

When the image display apparatus outputs synchronous signals through the display unit 180 for synchronization with the pointing device, the pointing device senses or receives the synchronous signal accordingly in operation S1010. Here, the synchronous signals are simultaneously output over the entire region of the display unit. Thus, the image display apparatus outputs a synchronous signal and at the same time, the pointing device can receive the synchronous signal without delay regardless of its position.

Also, the image display apparatus transmits a signal for calculating a position of the pointing device in operation S1020. It is assumed that the pointing device is touching the display unit of the image display apparatus. As mentioned above, this touch includes a case where the pointing device is located within a predetermined distance from the display unit without directly contacting the display unit.

A signal for position calculation may be the above-described scanning signal, and the scanning signal may include a first scanning signal and a second scanning signal. Since the display unit is a 2D plane, a touch position may be detected in two directions so that it may be expressed as coordinates. Accordingly, the image display apparatus may output both of the first scanning signal for obtaining a coordinate of a touch position according to a scanning result in the first direction, and the second scanning signal for obtaining a coordinate of a touch position according to a scanning result in the second direction. Here, the first direction may be a horizontal direction, and the second direction may be a vertical direction. In this case, the x-coordinate of the touch position may be obtained by the first scanning signal, and the y-coordinate of the touch position may be obtained by the second scanning signal.

As the pointing device receives the synchronous signal and the scanning signal for position calculation, the pointing device acquires time information regarding the time point when the signal is received at its current location, namely, touch time information. The pointing device may calculate coordinate information of the spot where the touch is made by using the touch time information in operation S1030. This is because the spot on the display unit from which the corresponding scanning signal is output is determined according to when the pointing device receives the scanning signal, and the coordinate information of the touch position can be deduced accordingly.

The pointing device transmits the calculated coordinate information to the image display apparatus, and thus the image display apparatus may acquire touch coordinate information or touch position information in operation S1040.

The embodiment described with reference to FIG. 10 corresponds to a case where temporal information is transformed into spatial information by the pointing device, and touch position information is calculated accordingly. However, according to another embodiment, when information regarding the time point when the pointing device receives a scanning signal after synchronization is transmitted to the image display apparatus, the control unit 170 of the image display apparatus may calculate touch position information regarding coordinates or the like of a touched spot. The latter embodiment will be described in detail with reference to FIG. 11.

Unlike the embodiment described with reference to FIG. 10, FIG. 11 illustrates a flowchart showing signal transmission between the image display apparatus and the pointing device 195. The operations S1010 to S1020 are identical between FIGS. 10 and 11, and thus a description thereof may be omitted.

After the synchronization with the image display apparatus is achieved, the pointing device having received a signal for position calculation transmits time information regarding the time point when the signal for position calculation is received to the image display apparatus in operation S1035. This information may be referred to as touch time information. By using the time information, the image display apparatus may discriminate a scanning signal transmitted at the time point according to the corresponding time information, and recognize the position on the display unit from which the corresponding scanning signal is output. That is, in operation S1045, by using the touch time information, the image display apparatus traces the scanning signal output at the corresponding time, and deduces information regarding the position where the touch is generated by using the position where the scanning signal is output. The process of calculating touch position information by using touch time information received from the pointing device may be performed by the control unit 170 of the image display apparatus.

The touch time information, the touch position information or the like, transmitted by the pointing device, may be input to the control unit 170 of the image display apparatus through the external interface unit.

Figure 12:
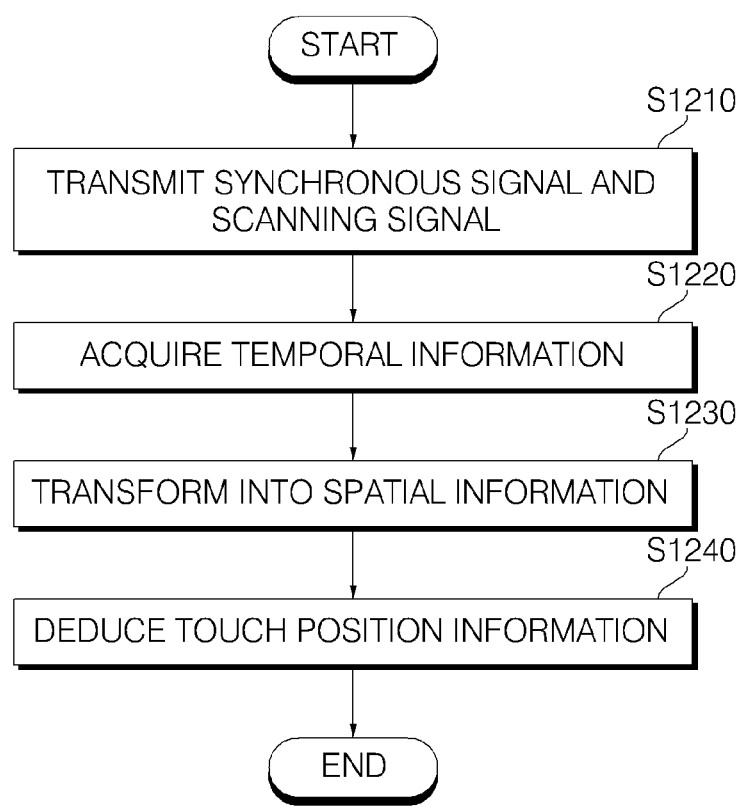
FIG. 12 is a flowchart illustrating a method for operating an image display apparatus according to an exemplary embodiment of the present invention.

FIG. 12 is a flowchart illustrating a method for operating the image display apparatus according to an exemplary embodiment of the present invention.

The image display apparatus outputs a synchronous signal and a scanning signal. The synchronous signal and the scanning signal, output through the display unit of the image display apparatus, is transmitted to the pointing device in operation S1210. As described above, the synchronous signal may be simultaneously output over the entire region of the display unit, and the scanning signal may sequentially output as if a plurality of signals scan the display unit in specific directions. In the embodiments described with reference to FIGS. 10 and 11, the scanning single may be the transmitted signal for calculating the position of the pointing device.

When synchronization between the image display apparatus and the pointing device is completed by the transmission/reception of the synchronous signal, a reference time point for acquiring temporal information used for touch-position calculation is determined. The temporal information for calculating the touch position may be acquired according to the time point when the scanning signal is received with reference to the reference time point in operation S1220. When the temporal information is acquired, the image display apparatus or the pointing device transforms the corresponding temporal information into spatial information in operation S1230. Here, in order for the image display apparatus to transform the temporal information into spatial information, the image display apparatus may receive the temporal information from the pointing device.

The temporal information may be touch time information as described above, and the spatial information may be touch position information. By using the touch time information, the position of the pointing device is deduced according to when the pointing device received the scanning signal after synchronization. The image display apparatus or the pointing device deduces the touch position information from the touch time information in operation S1240. The output position of the scanning signal output at the time point in the touch time information corresponds to the position on the display unit that the pointing device touched. For example, (x, y) coordinates of the touch position by the pointing device may be calculated from the time point when the first scanning signal and the second scanning signal are sensed by the pointing device.

Thereafter, when the control unit 170 of the image display apparatus acquires information regarding a touch position, the control unit 170 may interpret an optical touch into a user command according to the touch position, and perform a corresponding operation. For example, in the state where a menu image or a user interface image has been generated and displayed on the display unit 180 as an OSD object, if a user touches a specific item within the OSD object by using the pointing device 195, the control unit 170 performs an operation corresponding to the item (e.g., volume control, image quality control, new image formation, function selection or the like) or controls another module to perform the operation.

Alternatively, an optical touch method may be advantageous even for a case where an image of touch trace is displayed on the display unit 180. In the case of writing or drawing on the display unit 180 by using the pointing device 195, the pointing device 195 is quickly moved. In this case, even a small time difference in touch recognition makes it difficult to trace the coordinates or trace of a touch. Also, the optical touch method allows a touch position to be precisely determined even when an area of a touched spot is very small.

Besides, considering the characteristics of the optical touch method, the pointing device 195 and the display unit 180 do not necessarily need to come into physical contact with each other. This reduces the possibility of scratches or breakage caused in the display unit 180 due to physical touches.

As set forth above, according to the exemplary embodiments of the present invention, even when the pointing device is quickly moved in touching the display unit, the coordinates and trace of the touch can be accurately determined. Also, even in a case where an area of a touched spot is very small, the position of the touch can be precisely determined. Also, in the image display apparatus and the method for operating the same according to the exemplary embodiments of the present invention, since synchronization for calculating a touch position of the pointing device is performed by using an optical signal, the error in touch recognition, caused by the delay of a synchronous signal can be minimized. Also, according to an exemplary embodiment of the present invention, the display unit does not have to be directly pressurized to locate the position of a touch, thus eliminating the possibility of damage to devices or the deformation of appearance.

The image display apparatus and a method for operating the same according to the exemplary embodiments of the present invention is not intended to limit the application of the construction and the method described in the embodiments described above. The entirety or portion of the embodiments may be selectively combined so as to make various variations and modifications.

The method for operating an image display apparatus according to an exemplary embodiment of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for operating an image display apparatus having a display unit capable of sensing a touch made by a pointing device, the method comprising:
   outputting a synchronous signal through the entire region of the display unit;
   transmitting a first scanning signal scanning the display unit in a first direction and a second scanning signal scanning the display unit in a second direction to the pointing device; and
   acquiring touch position information including a time point when the first scanning signal is received by the pointing device after sensing the synchronous signal and a time point when the second scanning signal is received by the pointing device after sensing the synchronous signal.

2. The method of claim 1, wherein the first direction is a horizontal direction, and the second direction is a vertical direction, an X coordinate of a touch position of the pointing device is calculated from the first scanning signal, and a Y coordinate of the touch position of the pointing device is calculated from the second scanning signal.

3. The method of claim 1, wherein, when the synchronous signal being output comprises two or more synchronous signals, the synchronous signals are output a preset number of times for synchronization with the pointing device.

4. The method of claim 1, wherein the synchronous signal being output has a preset synchronization frequency for synchronization with the pointing device, and the synchronization frequency is different from a frequency of other signals transmitted by the image display apparatus.

5. The method of claim 1, wherein when the synchronous signal being output comprises two or more synchronous signals, the synchronous signals are output at a preset interval for synchronization with the pointing device.

6. The method of claim 1, further comprising:
   receiving from the pointing device the touch time information; and
   calculating coordinate information regarding the position of the pointing device from the touch time information,
   wherein the touch position information is acquired from the coordinate information.

7. The method of claim 1, wherein the pointing device calculates coordinate information regarding the position of the pointing device from the touch time information, and
   the image display apparatus acquires the touch position information from the coordinate information when the coordinate information is received from the pointing device.

8. The method of claim 1, further comprising:
   generating a touch image corresponding to a trace of a touch made on the display unit by the pointing device; and
   outputting the touch image.

9. The method of claim 1, further comprising:
   receiving a user command through the pointing device touching a specific position of the display unit; and
   performing an operation according to the user command corresponding to the touch position information of the pointing device.

10. An image display apparatus having a display unit capable of sensing a touch made by a pointing device, the image display apparatus comprising:
    a control unit generating a synchronous signal output through the entire region of the display unit, and a first scanning signal scanning the display unit in a first direction and a second scanning signal scanning the display unit in a second direction; and
    a display unit outputting the synchronous signal, the first scanning signal and the second scanning signal,
    wherein, the control unit acquires touch position information regarding a touch made by the pointing device by using touch time information including a time point when the first scanning signal is received by the pointing device after sensing the synchronous signal and a time point when the second scanning signal is received by the pointing device.

11. The image display apparatus of claim 10, wherein the first direction is a horizontal direction, and the second direction is a vertical direction, an X coordinate of a touch position of the pointing device is calculated from the first scanning signal, and a Y coordinate of the touch position of the pointing device is calculated from the second scanning signal.

12. The image display apparatus of claim 10, wherein when the synchronous signal output through the display unit comprises two or more synchronous signals, the display unit outputs the synchronous signals a preset number of times for synchronization with the pointing device.

13. The image display apparatus of claim 10, wherein the control unit generates the synchronous signal to have a preset synchronization frequency for synchronization with the pointing device, and the synchronization frequency is different from a frequency of other signals transmitted by the image display apparatus.

14. The image display apparatus of claim 10, wherein, when the synchronous signal being output through the display unit comprises two or more synchronous signals, the display unit outputs the synchronous signals at a preset interval for synchronization with the pointing device.

15. The image display apparatus of claim 10, further comprising an external device interface unit receiving from the pointing device the touch time information,
    wherein the control unit calculates coordinate information regarding a position of the pointing device from the touch time information, and acquires the touch position information from the coordinate information.

16. The image display apparatus of claim 10, wherein the pointing device calculate coordinate information regarding a position of the pointing device from the touch time information, and the image display apparatus further comprises an external device interface unit receiving the coordinate information from the pointing device,
    wherein the control unit acquires the touch position information from the coordinate information.

17. The image display apparatus of claim 10, wherein the control unit generates a touch image corresponding to a trace of a touch made on the display unit by the pointing device, and
    the display unit outputs the touch image.

18. The image display apparatus of claim 10, further comprising a user input interface unit receiving a user command as the pointing device touches a specific position on the display unit,
    wherein the control unit performs an operation according to the user demand corresponding to the touch position information of the pointing device.

\* \* \* \* \*